United States Patent
Hauser et al.

(10) Patent No.: US 12,456,999 B2
(45) Date of Patent: Oct. 28, 2025

(54) ELECTRONIC DEVICES WITH ADJUSTABLE RECEIVED SAMPLE BIT WIDTH

(71) Applicant: Apple Inc., Cupertino, CA (US)

(72) Inventors: Thomas Hauser, Holzkirchen (DE); Joachim Wehinger, Munich (DE); Michael Weber, Freising (DE); Andreas Augustin, Munich (DE)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 18/468,644

(22) Filed: Sep. 15, 2023

(65) Prior Publication Data

US 2024/0097727 A1 Mar. 21, 2024

Related U.S. Application Data

(60) Provisional application No. 63/407,470, filed on Sep. 16, 2022.

(51) Int. Cl.
*H04B 1/16* (2006.01)
*H03D 1/22* (2006.01)
*H04L 27/38* (2006.01)

(52) U.S. Cl.
CPC ............. *H04B 1/16* (2013.01); *H03D 1/2245* (2013.01); *H04L 27/3863* (2013.01)

(58) Field of Classification Search
CPC ..... H04L 27/3863; H04B 1/16; H03D 1/2245
See application file for complete search history.

(56) References Cited

U.S. PATENT DOCUMENTS

| | | | |
|---|---|---|---|
| 8,605,224 B2 * | 12/2013 | Trager | H04N 21/42638 348/725 |
| 2007/0218863 A1 * | 9/2007 | Futatsugi | H04B 17/24 455/403 |
| 2010/0290566 A1 * | 11/2010 | Nibe | H04B 1/40 375/340 |
| 2011/0096875 A1 * | 4/2011 | Amrutur | H04B 1/1027 375/346 |

FOREIGN PATENT DOCUMENTS

| | | |
|---|---|---|
| EP | 1672807 A1 | 6/2006 |
| WO | 2009120644 A1 | 10/2009 |

* cited by examiner

*Primary Examiner* — Rahel Guarino
(74) *Attorney, Agent, or Firm* — Treyz Law Group, P.C.; Michael H. Lyons

(57) ABSTRACT

An electronic device may be provided with an antenna, a receiver, and baseband circuitry coupled to the receiver over a digital interface. The receiver may receive radio-frequency signals using the antenna and may generate digital in-phase and quadrature-phase (I/Q) samples from the radio-frequency signals. The I/Q samples may have a bit width and may be transmitted to the baseband circuitry over the digital interface. The baseband circuitry may evaluate a radio condition of the receiver based on the I/Q samples. The baseband circuitry may adjust the bit width of the I/Q samples based on the radio condition. For example, the baseband circuitry may decrease the bit width when wireless performance metric data falls below a threshold and/or may increase the bit width when the wireless performance metric data exceeds a threshold. This may minimize power consumed by the digital interface without sacrificing wireless performance.

20 Claims, 5 Drawing Sheets

ELECTRONIC DEVICES WITH ADJUSTABLE RECEIVED SAMPLE BIT WIDTH

This application claims the benefit of U.S. Provisional Patent Application No. 63/407,470, filed Sep. 16, 2022, which is hereby incorporated by reference herein in its entirety.

FIELD

This disclosure relates generally to wireless communications, including wireless communications performed by electronic devices.

BACKGROUND

Communications systems can include electronic devices with wireless communications capabilities. Electronic devices with wireless communications capabilities use antennas to transmit and receive radio-frequency signals. Electronic devices with wireless communications capabilities can have a finite amount of power, such as power provided by a battery. If care is not taken, receiving radio-frequency signals can consume an excessive amount of power, thereby minimizing battery life for the electronic devices.

SUMMARY

Electronic devices may be provided with wireless circuitry. The wireless circuitry may include an antenna, a receiver, and baseband circuitry. The receiver may be coupled to the antenna over a radio-frequency transmission line. The baseband circuitry may be coupled to the receiver over a digital interface. The receiver may receive radio-frequency signals using the antenna. The receiver may generate digital in-phase and quadrature-phase (I/Q) samples from the radio-frequency signals. The I/Q samples may have a bit width. The receiver may transmit the I/Q samples to the baseband circuitry over the digital interface.

The baseband circuitry may evaluate a radio condition of the receiver based on the I/Q samples. The baseband circuitry may adjust the bit width of the I/Q samples based on the radio condition. The baseband circuitry may transmit a control signal to the receiver that configures the receiver to implement an updated bit width for subsequent transmission of the I/Q samples to the baseband circuitry. For example, the baseband circuitry may generate wireless performance metric data characterizing the radio condition based on the I/Q samples. The baseband circuitry may compare the wireless performance metric data to one or more thresholds over one or more hysteresis periods. The baseband circuitry may, for example, decrease the bit width when the wireless performance metric data falls below a first threshold for a first hysteresis period and/or may increase the bit width when the wireless performance metric data exceeds a second threshold for a second hysteresis period. This may serve to minimize power consumption by the digital interface without sacrificing wireless performance.

An aspect of the disclosure provides an electronic device. The electronic device can include an antenna. The electronic device can include a receiver configured to receive radio-frequency signals using the antenna and configured to generate, from the radio-frequency signals, digital samples having a bit width. The electronic device can include a digital interface coupled to the receiver, the receiver being configured to transmit the digital samples over the digital interface. The electronic device can include one or more processors configured to adjust the bit width of the digital samples.

An aspect of the disclosure provides a method of operating an electronic device. The method can include with a receiver, receiving radio-frequency signals using an antenna. The method can include with the receiver, generating in-phase quadrature-phase (I/Q) samples based on the radio-frequency signals. The method can include with a digital interface, conveying the I/Q samples to baseband circuitry. The method can include with one or more processors, adjusting a bit width of the I/Q samples based on wireless performance metric data characterizing radio-frequency performance of the receiver.

An aspect of the disclosure provides a method of operating an electronic device. The method can include with a receiver, receiving radio-frequency signals using an antenna. The method can include with the receiver, transmitting, to baseband circuitry, digital samples of the radio-frequency signals, wherein the digital samples have a first bit width when the receiver exhibits a first level of radio-frequency performance, and the digital samples have a second bit width that is less than the first bit width when the receiver exhibits a second level of radio-frequency performance that is less than the first level of radio-frequency performance.

DETAILED DESCRIPTION

Figure 1:
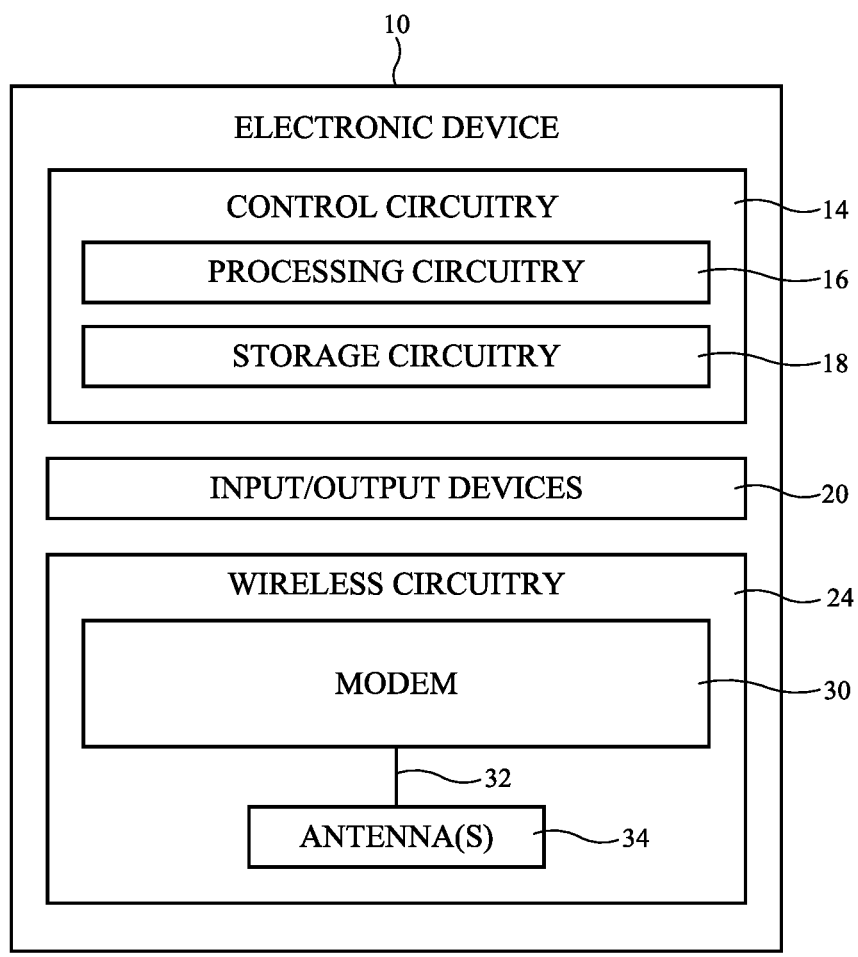
FIG. 1 is a schematic block diagram of an illustrative electronic device having wireless circuitry in accordance with some embodiments.

FIG. 1 is a block diagram of an illustrative electronic device 10. Device 10 may be a computing device such as a laptop computer, a desktop computer, a computer monitor containing an embedded computer, a tablet computer, a cellular telephone (mobile phone), a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 18. Storage circuitry 18 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 18 may include storage that is integrated within device 10 and/or removable storage media.

Control circuitry 14 may include processing circuitry such as processing circuitry 16. Processing circuitry 16 may be used to control the operation of device 10. Processing circuitry 16 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 18 (e.g., storage circuitry 18 may include non-transitory (tangible) computer readable storage media that stores the software code). The software code may sometimes be referred to as program instructions, software, data, instructions, or code. Software code stored on storage circuitry 18 may be executed by processing circuitry 16.

Control circuitry 14 may be used to run software on device 10 such as one or more software applications (apps). The applications may include satellite navigation applications, internet browsing applications, voice-over-internet-protocol (VOIP) telephone call applications, email applications, media playback applications, operating system functions, gaming applications, productivity applications, workplace applications, augmented reality (AR) applications, extended reality (XR) applications, virtual reality (VR) applications, scheduling applications, consumer applications, social media applications, educational applications, banking applications, spatial ranging applications, sensing applications, security applications, media applications, streaming applications, automotive applications, video editing applications, image editing applications, rendering applications, simulation applications, camera-based applications, imaging applications, news applications, and/or any other desired software applications.

To support interactions with external communications equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, 6G protocols, cellular sideband protocols, etc.), device-to-device (D2D) protocols, antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol. Radio-frequency signals conveyed using a cellular telephone protocol may sometimes be referred to herein as cellular telephone signals.

Device 10 may include input-output devices 20. Input-output (I/O) devices 20 may be used to allow data to be supplied to device 10 and to allow data to be provided from device 10 to external devices. Input-output devices 20 may include user interface devices, data port devices, and other input-output components. For example, input-output devices 20 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, image sensors, light sensors, radar sensors, lidar sensors, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 20 may be peripherals that are coupled to a main processing unit or other portion of device 10 via a wired or wireless link).

Electronic device 10 may include wireless circuitry 24. Wireless circuitry 24 may support wireless communications. Wireless circuitry 24 (sometimes referred to herein as wireless communications circuitry 24) may include one or more antennas 34. Antennas 34 may transmit radio-frequency signals to and/or may receive radio-frequency signals from external communications equipment. The external communications equipment may include one or more other electronic devices such as device 10, a wireless base station, or a wireless access point, as examples.

Wireless circuitry 24 may also include one or more modems 30. Modem 30 (sometimes referred to herein as a radio) may include radio-frequency circuitry and baseband circuitry. Modem 30 may be, for example, a cellular modem. The baseband circuitry may include one or more baseband processors or other circuitry that operates at baseband. The radio-frequency circuitry may include transceiver circuitry coupled to the baseband circuitry over one or more baseband paths. The one or more baseband paths may be implemented as a digital interface (e.g., having digital signal lines that convey digital data bits). The transceiver circuitry may include one or more transmitters and one or more receivers. The receiver(s) and transmitter(s) may be integrated into one or more transceivers if desired.

The radio-frequency circuitry in modem 30 may be coupled to one or more antennas 34 over one or more radio-frequency transmission lines 32. Radio-frequency transmission lines 32 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 32 may be integrated into rigid and/or flexible printed circuit boards if desired. One or more radio-frequency lines 32 may be shared between multiple transceivers in transceiver circuitry 30 if desired. Radio-frequency front end (RFFE) modules may be interposed on one or more radio-frequency transmission lines 32. The radio-frequency front end modules may include substrates, integrated circuits, chips, or packages that are separate from transceiver circuitry 30 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 32.

In performing wireless transmission, the baseband circuitry in modem 30 may provide baseband signals (e.g., digital signals containing wireless data for transmission to one or more other devices) to the transceiver circuitry (e.g., one or more transmitters) in modem 30 over the digital interface. For example, the baseband circuitry may process incoming digital data through encoding, modulation/demodulation, time and frequency conversions, pulse shaping, etc., to generate processed baseband data that is conveyed by the baseband signals. The transceiver circuitry in modem 30 may modulate the processed baseband data onto radio-frequency signals for transmission by antenna(s) 34. For example, the transceiver circuitry may include mixer circuitry and local oscillator circuitry for up-converting the baseband signals to radio frequencies prior to transmission over antenna(s) 34. The transceiver circuitry may also include digital-to-analog converter (DAC) circuitry for converting signals between digital and analog domains, amplifier circuitry (e.g., power amplifier circuitry) for amplifying the radio-frequency signals, filter circuitry, switching circuitry, etc. The transceiver circuitry may transmit the radio-frequency signals over antenna(s) 34 via radio-frequency transmission line path(s) 32. Antenna(s) 34 may transmit the radio-frequency signals to external wireless equipment by radiating the radio-frequency signals into free space.

Antenna(s) 34 may be formed using any desired antenna structures for conveying radio-frequency signals. For example, antenna(s) 34 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 34 over time. If desired, two or more of antennas 34 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given/selected beam pointing direction (e.g., towards external communications equipment).

The term "convey radio-frequency signals" as used herein means the transmission and/or reception of the radio-frequency signals (e.g., for performing unidirectional and/or bidirectional wireless communications with external wireless communications equipment). Similarly, the term "convey wireless data" as used herein means the transmission and/or reception of wireless data using radio-frequency signals. Antenna(s) 34 may transmit the radio-frequency signals by radiating the radio-frequency signals into free space (or to free space through intervening device structures such as a dielectric cover layer). Antenna(s) 34 may additionally or alternatively receive the radio-frequency signals from free space (e.g., through intervening devices structures such as a dielectric cover layer). The transmission and reception of radio-frequency signals by antennas 34 each involve the excitation or resonance of antenna currents on an antenna resonating element in the antenna by the radio-frequency signals within the frequency band(s) of operation of the antenna.

In performing wireless reception, antenna(s) 34 may receive radio-frequency signals from one or more other devices. Antenna(s) 34 may pass the received radio-frequency signals to transceiver circuitry (e.g., one or more receivers) in modem 30 over radio-frequency transmission line(s) 32. The transceiver circuitry may include demodulation circuitry, mixer circuitry for down-converting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 34. The transceiver circuitry in modem 30 may convert the received radio-frequency signals into baseband signals (e.g., digital data samples). The transceiver circuitry may transmit the baseband signals to the baseband circuitry in modem 30 over the digital interface. The baseband circuitry may process the incoming digital data from the received baseband signals through decoding, demodulation, time and frequency conversions, pulse shaping, etc., to extract wireless data from the baseband signals. The extracted wireless data may be passed up the protocol stack or to an application processor for further processing.

The transceiver circuitry in modem 30 may transmit and/or receive radio-frequency signals within corresponding frequency bands at radio frequencies (sometimes referred to herein as communications bands or simply as "bands"). The frequency bands handled by transceiver circuitry 30 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, cellular sidebands, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 24 may also be used to perform spatial ranging operations if desired.

The example of FIG. 1 is illustrative and non-limiting. While control circuitry 14 is shown separately from wireless circuitry 24 in the example of FIG. 1 for the sake of clarity, wireless circuitry 24 may include processing circuitry (e.g., one or more processors) that forms a part of processing circuitry 16 and/or storage circuitry that forms a part of storage circuitry 18 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of transceiver circuitry 30. Baseband circuitry 26 may, for example, access a communication protocol stack on control circuitry 14 (e.g., storage circuitry 18) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum (NAS) layer.

Figure 2:
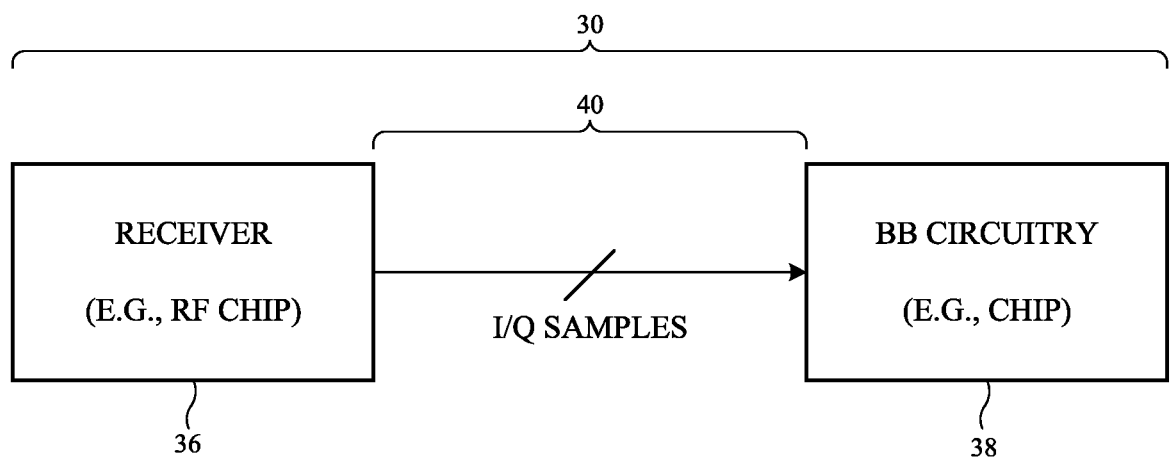
FIG. 2 is a diagram of an illustrative modem having a receiver coupled to baseband circuitry over a digital interface in accordance with some embodiments.

FIG. 2 is a diagram of modem 30. As shown in FIG. 2, modem 30 may include a receiver 36, baseband (BB) circuitry 38, and a digital interface 40 that couples receiver 36 to baseband circuitry 38. Receiver 36 forms part of the radio-frequency (RF) circuitry of modem 30 and may, if desired, be integrated into transceiver circuitry in modem 30 (e.g., with one or more transmitters).

Receiver 36 may be implemented on an RF chip (e.g., an integrated circuit chip or package) in modem 30, if desired. The RF chip may also include one or more other receivers and/or one or more transmitters (e.g., transceiver circuitry in modem 30). Baseband circuitry 38 may also be implemented as a chip in modem 30 (e.g., an integrated circuit chip or package). If desired, the chip used to form baseband circuitry 38 may be separate from the RF chip used to form receiver 36 (e.g., baseband circuitry 38 may be implemented on a baseband chip).

Digital interface 40 may couple receiver 36 (e.g., the RF chip) to baseband circuitry 38 (e.g., the baseband chip). Digital interface 40 may sometimes be referred to herein as RF-BB interface 40. Digital interface 40 may form a baseband path between receiver 36 and baseband circuitry 38. Digital interface 40 may include digital signal lines that convey digital data bits. Digital interface 40 may be used to transmit digital samples from receiver 36 to baseband circuitry 38. The digital samples may include in-phase (I) and quadrature-phase (Q) samples, sometimes referred to herein as I/Q samples. While modem 30 may also include one or more transmitters that transmit signals for baseband circuitry 38 (e.g., receiver 36 may be integrated into a transceiver that also transmits radio-frequency signals and digital interface 40 may also transmit samples from baseband circuitry 38 to the transceiver for transmission via antenna(s) 34), only the reception of radio-frequency signals by modem 30 and the corresponding received I/Q samples are described herein for the sake of simplicity.

During signal reception, receiver 36 may receive radio-frequency signals from antenna(s) 34 over radio-frequency transmission line(s) 34 (FIG. 1). Receiver 36 may include mixer circuitry that downconverts the radio-frequency signals to baseband signals. Receiver 36 may include an analog-to-digital converter (ADC) that converts the baseband signals from the analog domain to the digital domain. The ADC may convert the baseband signals to a stream of I/Q samples (e.g., the ADC may sample the analog signal to produce digital I/Q samples). The ADC may pass the stream of I/Q samples onto digital interface 40. Digital interface 40 may transmit the I/Q samples to baseband circuitry 38. Baseband circuitry 38 may demodulate and decode the I/Q samples to recover the wireless data intended for reception by device 10.

The I/Q samples transmitted over digital interface 40 each have a corresponding bit width (e.g., the I/Q samples may be 4-bit samples, 8-bit samples, 16-bit samples, 64-bit samples, etc.). In some implementations, the bit width remains fixed over time, and is dimensioned based on algorithm performance requirements derived from corner use cases and radio conditions. Digital interface 40 may contribute significantly to the power consumption of modem 30. The power consumption of the interface generally increases with higher data rate. The data rate of the interface increases proportionally to the bit width per I/Q sample.

In practice, a fixed bit width for the I/Q samples will be higher than required in several radio conditions (e.g., radio-frequency channel or propagation conditions associated with the wireless performance of receiver 36 in receiving radio-frequency signals using antenna(s) 34). This is because the fixed bit width is set such that receiver performance is optimized in best-case radio channel conditions with relatively high quadrature amplitude modulation (QAM) performance requirements. Therefore, such a fixed bit width is generally larger than what is required in most situations with worse-than-ideal radio conditions in the channel and lower QAM modulations. This leads to a significant power overhead regarding the number of bits transmitted over the RF-BB interface, as there is a power penalty due to the higher transmitted number of bits (and the corresponding data rate is related to higher power consumption of the interface). Put differently, in many less-than-ideal radio conditions, the least significant bits of the I/Q samples are dominated by noise and thus do not contribute to the wireless performance of the modem. Retaining these bits in the I/Q samples, as required when a fixed bit width is used, unnecessarily consumes excessive power for device 10 during signal reception.

To mitigate these issues and minimize power consumption on device 10, baseband circuitry 38 may actively adjust the bit width of the I/Q samples received over digital interface 40 based on the current radio conditions for receiver 36. For example, baseband circuitry 38 may reduce the number of bits transmitted over digital interface 40 (e.g., the bit width of the I/Q samples) by evaluating the current radio conditions for receiver 36 and use-case dependent signal-to-noise ratio (SNR) requirements. Depending on the current needs, the bit width and I/Q format may be dynamically adapted. In worst case radio conditions, the bit width of the I/Q samples can be decreased without any receiver performance degradation, whereas in optimum radio conditions the maximum bit width of the I/Q samples may be used to avoid any performance degradation, particularly for higher QAM modulation schemes, which may be scheduled by the base station that communicates with device 10. In this way, the number of bits transmitted via the RF-BB interface may be dynamically reduced to the current channel conditions in the field, which leads to a significant reduction in power consumption by the BB-RF interface. Since the interface is a major contributor to cellular modem power consumption, a substantial reduction of overall system power consumption may be achieved.

Figure 3:
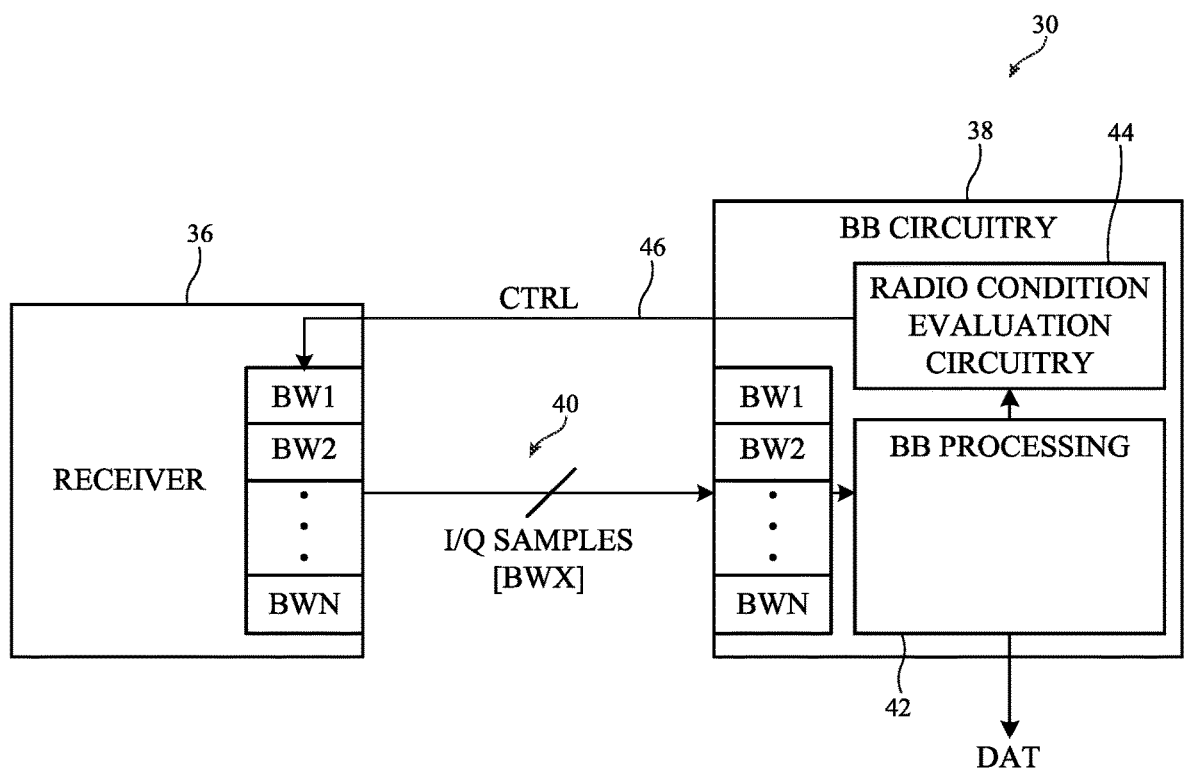
FIG. 3 is a diagram of an illustrative modem having baseband circuitry that adjusts the bit width of I/Q samples conveyed over a digital interface based on radio conditions of a receiver in accordance with some embodiments.

FIG. 3 is a diagram showing how baseband circuitry 38 may dynamically adjust the bit width of the I/Q samples on digital interface 40 (e.g., to dynamically adjust the bit width of digital interface 40). As shown in FIG. 3, baseband circuitry 38 may include radio condition evaluation circuitry 44 and baseband processing circuitry 42. Baseband processing circuitry 42 may be coupled to receiver 36 over digital interface 40. Receiver 36 may transmit I/Q samples to baseband processing circuitry 42 over digital interface 40. Baseband processing circuitry 42 may demodulate and decode the I/Q samples to recover wireless data DAT from the I/Q samples. Baseband processing circuitry 42 may also pass the I/Q samples to radio condition evaluation circuitry 44.

Radio condition evaluation circuitry 44 may evaluate, measure, monitor, or otherwise gather information about the radio conditions of receiver 36 based on the received I/Q samples. The radio conditions may include radio channel conditions, propagation conditions, and/or any other conditions affecting the performance of receiver 36 in receiving radio-frequency signals from external equipment such as a wireless base station. The radio conditions may be affected by the presence of obstacles between device 10 and the wireless base station, the path length between the wireless base station and device 10, the presence of external objects at or near antenna(s) 34 (e.g., objects that may detune or load the antennas), hardware non-idealities in receiver 36 and/or antenna(s) 34, hardware non-idealities in the wireless base station, multi-path issues for the radio-frequency signals conveyed between device 10 and the wireless base station, or any other conditions affecting radio-frequency performance.

Radio condition evaluation circuitry 44 may select a bit width BWX for the I/Q samples based on the evaluated radio conditions. As shown in FIG. 3, digital interface 40 may support a set of N different bit widths BW1, BW2, BWN, etc. Radio condition evaluation circuitry 44 may transmit a control signal CTRL over control path 46 that identifies the selected bit width BWX for digital interface 40. Control signal CTRL may configure receiver 36 to implement the selected bit width BWX (e.g., a selected one of the N different bit widths BW1, BW2, BWN, etc.). Once configured with the selected bit width BWX, receiver 36 may begin to transmit I/Q samples having selected bit width BWX over digital interface 40. This process may be repeated over time to update and adjust the bit width of the I/Q samples on digital interface 40 as necessary to minimize power consumption without sacrificing wireless performance.

Figure 4:
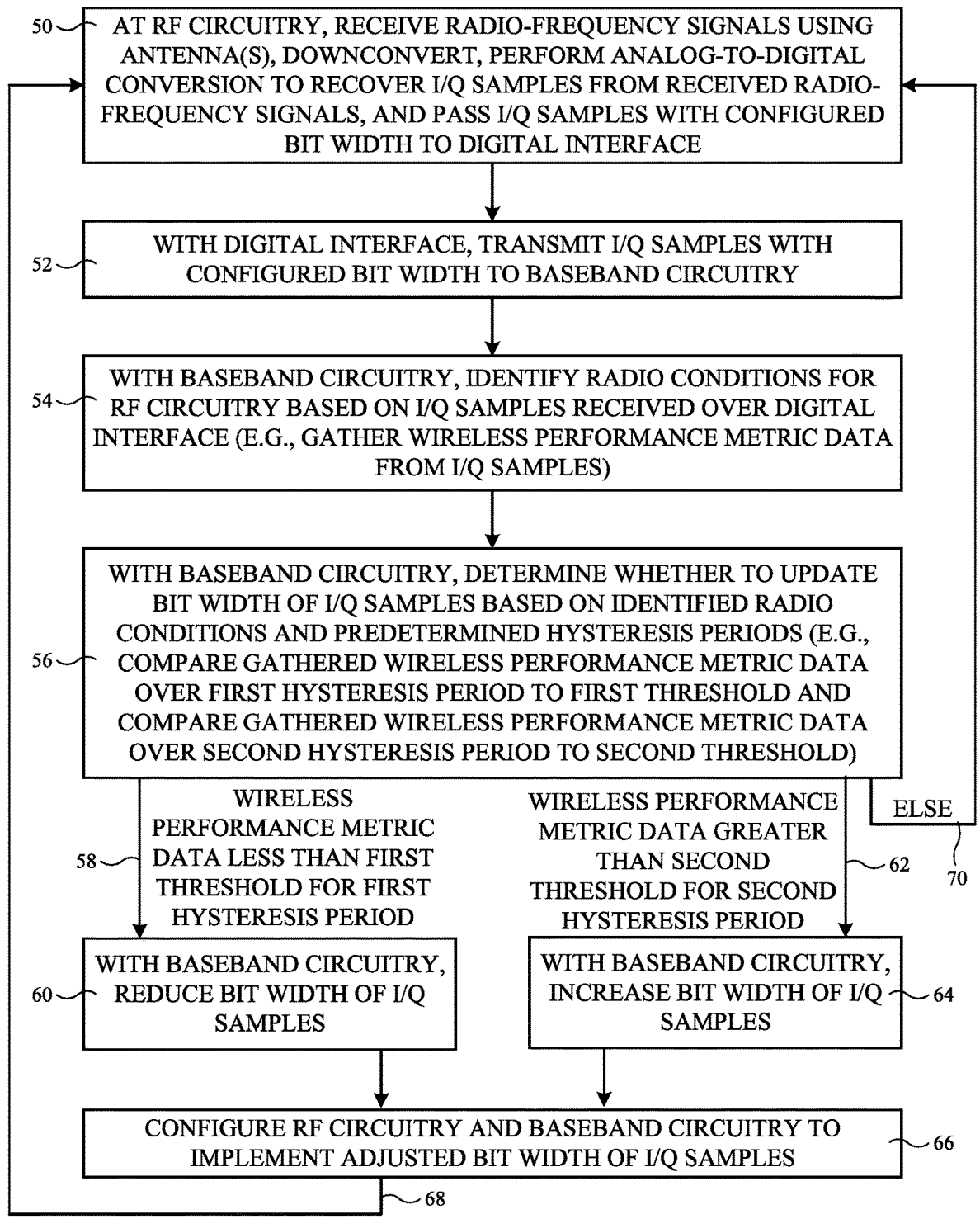
FIG. 4 is a flow chart of illustrative operations that may be performed by wireless circuitry to adjust the bit width of I/Q samples conveyed over a digital interface based on radio conditions of a receiver in accordance with some embodiments.

FIG. 4 is a flow chart of illustrative operations that may be performed by wireless circuitry 24 to adjust the bit width of I/Q samples conveyed over digital interface 40 based on the radio conditions for receiver 36.

At operation 50, receiver 36 may receive radio-frequency signals using antenna(s) 34. Receiver 36 may downconvert the received radio-frequency signals to baseband signals. Receiver 36 may convert the baseband signals from the analog domain to the digital domain (e.g., may sample the baseband signals) to recover I/Q samples from the received radio-frequency signals. The analog-to-digital conversion may output the I/Q samples with a corresponding (configured) bit width onto digital interface 40 (e.g., an initial bit width).

At operation 52, digital interface 40 may transmit the I/Q samples with the configured (e.g., initial) bit width to baseband circuitry 38. Baseband processing circuitry 42 may pass the I/Q samples to radio condition evaluation circuitry 44.

At operation 54, radio condition evaluation circuitry 44 may identify (e.g., evaluate, monitor, measure, sense, etc.) the radio conditions for receiver 36 based on the received I/Q samples. For example, radio condition evaluation circuitry 44 may generate wireless performance metric data based on the received I/Q samples. The wireless performance metric data may include SNR values, error rate values (e.g., bit error rate (BER) values, block error rate (BLER) values, etc.), channel quality indicator (CQI) values, information identifying the modulation scheme of the I/Q samples, and/or any other desired information characterizing the radio-frequency performance of receiver 36. A combination of different wireless performance metrics may be used to select/update the bit width if desired.

At operation 56, radio condition evaluation circuitry 44 may determine whether to update (adjust) the bit width of the I/Q samples on digital interface 40 based on the identified radio conditions for receiver 36. This may involve, for example, selecting a new (updated or adjusted) bit width of the I/Q samples based on the identified wireless performance metric data. If desired, radio condition evaluation circuitry 44 may determine whether to update the bit width based on one or more hysteresis periods. The hysteresis periods are durations of time that help to prevent excessive changes in bit width over time (e.g., to help avoid unnecessary updates to the bit width when radio conditions only change for a short period of time).

For example, radio condition evaluation circuitry 44 may compare the wireless performance metric data gathered from the I/Q samples to one or more predetermined characteristics or conditions (e.g., predetermined ranges of wireless performance metric data values). The predetermined characteristics or conditions may include one or more thresholds such as at least a first threshold TH1 and a second threshold TH2. If desired, radio condition evaluation circuitry 44 may compare the wireless performance metric data gathered over different first hysteresis periods to each of the threshold values. For example, radio condition evaluation circuitry 44 may compare the wireless performance metric data gathered over a first hysteresis period to first threshold TH1 and may compare the wireless performance metric data gathered over a second hysteresis period to first threshold TH2.

If radio condition evaluation circuitry 44 gathers wireless performance metric data that is less than first threshold TH1 for the duration of the first hysteresis period (or that otherwise matches a first characteristic/condition), processing may proceed to operation 60 over path 58. Such a situation may be indicative of relatively poor radio conditions at receiver 36, such that the least significant bits of the I/Q samples are dominated by noise and thus consume excessive power without contributing to the wireless performance of the modem. At operation 60, radio condition evaluation circuitry 44 may therefore reduce the bit width of the I/Q samples (e.g., may select a new/updated bit width that is lower than the initial bit width). Processing may then proceed to operation 66.

If radio condition evaluation circuitry 44 gathers wireless performance metric data that greater than second threshold TH2 for the duration of the second hysteresis period (or that otherwise matches a second characteristic/condition other than the first characteristic/condition), processing may proceed from operation 56 to operation 64 over path 62. Such a situation may be indicative of relatively good radio conditions at receiver 36, such that the least significant bits of the I/Q samples contribute to the wireless performance of the modem and such that the modem fully supports higher QAM modulations. At operation 64, radio condition evaluation circuitry 44 may therefore increase the bit width of the I/Q samples (e.g., may select a new/updated bit width that is higher than the initial bit width). Processing may then proceed to operation 66.

If neither the first characteristic/condition nor the second characteristic/condition are met (e.g., if the gathered wireless performance metric data fails to exceed second threshold TH2 for the second hysteresis period and fails to fall below first threshold TH1 for the first hysteresis period), the current bit width may be satisfactory for the current radio conditions and needs of the modem, and processing may loop back to operation 50 via path 70 (e.g., without updating/adjusting the bit width of the I/Q samples).

At operation 66, radio condition evaluation circuitry 44 may configure baseband circuitry 38 and receiver 36 to implement the new (updated/adjusted) bit width selected by radio condition evaluation circuitry 44 based on current radio condition for receiver 36. For example, radio condition evaluation circuitry 44 may generate a control signal CTRL that identifies the new selected bit width and may transmit control signal CTRL to receiver 36. Receiver 36 may reconfigure its analog-to-digital converter to begin outputting I/Q samples at the new bit width selected by radio condition evaluation circuitry 44. This reconfiguration may, for example, involve powering receiver 36 off and then on to implement the new bit width (e.g., during a slot in which device 10 is not scheduled to receive wireless data).

In addition, baseband circuitry 38 may synchronize the timing of bit width switching with receiver 36. As one example, radio condition evaluation circuitry 44 may provide a sample counter to receiver 36 (e.g., in control signal CTRL) defining the first I/Q sample that will exhibit the new bit width. As another example, additional header information may be added in the BB-RF interface MAC layer protocol format for the packet data. For example, receiver 36 may include multiple I/Q samples together in a single block having a header and may transmit the block over digital interface 40. The header may include information informing baseband circuitry 38 of when (e.g., which subsequent I/Q sample) the receiver will begin transmitting I/Q samples using the new bit width. As yet another example, a sideband signal and register information between receiver 36 and baseband circuitry 38 may be used for synchronization (e.g., receiver 36 may transmit an additional signal to baseband circuitry 38 in parallel with the I/Q samples that inform the baseband circuitry of when the receiver will begin transmitting I/Q samples using the new bit width).

Once modem 30 has been configured to begin transmitting I/Q samples over digital interface 40 using the newly configured (selected/updated) bit width, processing may loop back to operation 50 via path 68. Receiver 36 may then begin to transmit I/Q samples to baseband circuitry 38 with the newly configured (selected/updated) bit width. In this way, baseband circuitry 38 may continue to monitor and update the bit width based on radio conditions to conserve power in modem 30 when possible, without negatively impacting wireless performance.

Figure 5:
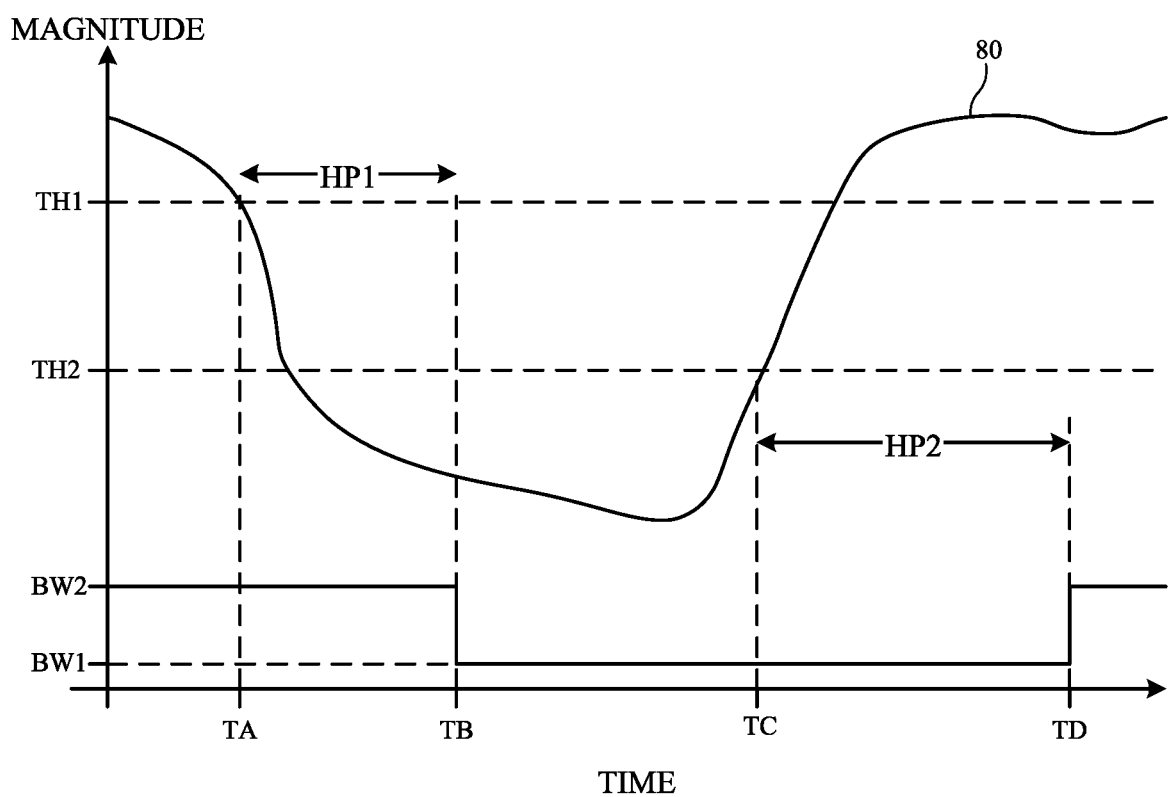
FIG. 5 is a timing diagram showing how different thresholds and hysteresis periods may be used to adjust the bit width of I/Q samples conveyed over a digital interface in accordance with some embodiments.

FIG. 5 is a timing diagram showing one example of how baseband circuitry 38 may dynamically adjust the bit width of digital interface 40 in real time based on the radio condition of receiver 36. Curve 80 of FIG. 5 plots the measured radio condition of receiver 36. Curve 80 may, for example, plot wireless performance metric data gathered by radio condition evaluation circuitry 44. Curve 82 plots the bit width BW of the I/Q samples transmitted over digital interface 40 by receiver 36.

Radio condition evaluation circuitry 44 may compare the gathered wireless performance metric data (curve 80) to one or more threshold such as first threshold TH1 and second threshold TH2 (e.g., while processing operation 56 of FIG. 4). Second threshold TH2 may, for example, be less than first threshold TH1. Radio condition evaluation circuitry 44 may also compare the gathered wireless performance metric data to one or more hysteresis periods such as first hysteresis period HP1 and second hysteresis period HP2.

As shown by curve 82, the I/Q samples may be initially transmitted with bit width BW2. At time TA, radio condition evaluation circuitry 44 may measure the wireless performance metric data falling below first threshold TH1 (e.g., due to deteriorated radio conditions at receiver 36). After the wireless performance metric data remains below first threshold TH1 for first hysteresis period HP1 (e.g., by time TB), radio condition evaluation circuitry 44 may reduce the bit width of the I/Q samples from bit width BW2 to bit width BW1 at time TB (e.g., while processing operation 60 of FIG. 4). This may serve to conserve power in modem 30 without affecting wireless performance.

At time TC, radio condition evaluation circuitry 44 may measure the wireless performance metric data rising above second threshold TH2 (e.g., due to improved radio conditions at receiver 36). After the wireless performance metric data remains above second threshold TH2 for second hysteresis period HP2 (e.g., by time TD), radio condition evaluation circuitry 44 may increase the bit width of the I/Q samples from bit width BW1 back to bit width BW2 at time TD (e.g., while processing operation 64 of FIG. 4). Hysteresis periods HP1 and HP2 may be set to prevent the modem from switching between bit widths too frequently.

In this way, baseband circuitry 38 may dynamically adjust the bit width of the I/Q samples based on the current radio conditions of receiver 36 over time in a manner that conserves power without sacrificing performance. The example of FIG. 5 is illustrative and non-limiting. Digital interface 40 may support more than two bit widths BW for the I/Q samples if desired. More than two thresholds may be used for comparisons. Curves 80 and 82 may have other shapes in practice. In general, curve 80 may be compared to any desired predetermined ranges of values and/or any desired features or characteristics of curve 80 may be detected to determine when to increase or decrease the bit width of the I/Q samples. If desired, the bit width decision may be handled separately for each carrier in a multi-carrier communication and for each RAT in multi-RAT communication. For example, baseband circuitry 38 may handle LTE and NR RATs in parallel via the same digital interface 40 (e.g., where the LTE samples and the NR samples have different headers).

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent with."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-5 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Wireless circuitry comprising:
an antenna;
a receiver configured to receive radio-frequency signals using the antenna and configured to generate, from the radio-frequency signals, digital samples having a bit width;
a digital interface coupled to the receiver, the receiver being configured to transmit the digital samples over the digital interface; and
baseband circuitry configured to adjust the bit width of the digital samples.

2. The wireless circuitry of claim 1, wherein the baseband circuitry is configured to adjust the bit width based on a radio condition of the receiver.

3. The wireless circuitry of claim 2, wherein the baseband circuitry is configured to generate, based on the digital samples, wireless performance metric data characterizing the radio condition of the receiver, the baseband circuitry being configured to adjust the bit width based on the wireless performance metric data.

4. The wireless circuitry of claim 3, wherein the wireless performance metric data comprises signal-to-noise ratio (SNR) values, bit error rate (BER) values, block error rate (BLER) values, channel quality indicator (CQI) values, or information identifying a modulation scheme of the digital samples.

5. The wireless circuitry of claim 3, the baseband circuitry being further configured to:
reduce the bit width when the wireless performance metric data remains below a first threshold for a first period.

6. The wireless circuitry of claim 5, the baseband circuitry being further configured to:
increase the bit width when the wireless performance metric data remains above a second threshold for a second period, the second threshold being lower than the first threshold.

7. The wireless circuitry of claim 1, wherein the baseband circuitry is configured to transmit a control signal to the receiver that configures the receiver to adjust the bit width of the digital samples.

8. The wireless circuitry of claim 1, further comprising:
a baseband chip that includes the baseband circuitry; and
a radio chip that includes the receiver, wherein the digital interface is coupled between the baseband chip and the radio chip.

9. The wireless circuitry of claim 1, wherein the digital samples comprise in-phase and quadrature-phase (I/Q) samples.

10. A method of operating wireless circuitry, the method comprising:
receiving, using a receiver, radio-frequency signals using an antenna;
conveying, using a digital interface, in-phase quadrature-phase (I/Q) samples from the receiver to baseband circuitry; and
adjusting, using one or more processors, a bit width of the I/Q samples based on wireless performance metric data characterizing radio-frequency performance of the receiver, wherein adjusting the bit width includes
reducing the bit width in response to the wireless performance metric data being within a first range of values for a first time period.

11. The method of claim 10, wherein adjusting the bit width comprises:
generating, with the one or more processors, the wireless performance metric data based on the I/Q samples; and
selecting, using the one or more processors, the bit width based on the wireless performance metric data.

12. The method of claim 11, further comprising:
transmitting, using the baseband circuitry, a control signal to the receiver that configures the receiver to generate the I/Q samples with the selected bit width.

13. The method of claim 12, further comprising:
transmitting, using the baseband circuitry, a sample counter to the receiver that identifies a first I/Q sample to have the selected bit width.

14. The method of claim 12, further comprising:
transmitting, using the receiver, a block of the I/Q samples over the digital interface, the block having a header that identifies a first I/Q sample to have the selected bit width.

15. The method of claim 12, further comprising:
with the receiver, transmitting, to the baseband circuitry, a signal separate from the I/Q samples that identifies a first I/Q sample to have the selected bit width.

16. The method of claim 12, wherein selecting the bit width comprises:
increasing the bit width when the wireless performance metric data is within a second range of values for a second time period.

17. The method of claim 10, wherein adjusting the bit width further comprises:

increasing the bit width in response to the wireless performance metric data being within a second range of values for a second time period, wherein the second range of values is different from the first range of values.

18. A method of operating circuitry, the method comprising:

receiving, using a receiver, radio-frequency signals via an antenna; and transmitting, using the receiver, digital samples of the radio-frequency signals to baseband circuitry, wherein
the digital samples have a first bit width when the receiver exhibits a first level of radio-frequency performance, and
the digital samples have a second bit width that is less than the first bit width when the receiver exhibits a second level of radio-frequency performance that is less than the first level of radio-frequency performance.

19. The method of claim 18, further comprising:

generating, using one or more processors, wireless performance metric data based on the digital samples transmitted to the baseband circuitry, wherein the receiver exhibits the first level of radio-frequency performance when the wireless performance metric data exceeds a first threshold value and exhibits the second level of radio-frequency performance when the wireless performance metric data is less than a second threshold value, the second threshold value being higher than the first threshold value.

20. The method of claim 18, wherein the receiver is on a first integrated circuit chip in the circuitry, the baseband circuitry is on a second integrated circuit chip in the circuitry, and transmitting the digital samples to the baseband circuitry comprises transmitting the digital samples over a digital interface that couples the first integrated circuit chip to the second integrated circuit chip.

\* \* \* \* \*